United States Patent [19]
Morse et al.

[11] 3,852,931
[45] Dec. 10, 1974

[54] RESILIENT FOUNDATION CONNECTION

[76] Inventors: Charles F. Morse, 149 N. Los Palmas, Los Angeles, Calif. 90004; Donald G. Seal, 1585 S. Coast Highway, Laguna Beach, Calif. 92651

[22] Filed: May 1, 1972

[21] Appl. No.: 249,306

[52] U.S. Cl. .................................. 52/293, 52/573
[51] Int. Cl. ...................... E04b 1/98, E02d 31/08
[58] Field of Search ............ 52/293, 410, 101, 573, 52/347, 295, 393, 403, 300; 85/70; 248/22, 25; 161/88, 96, 144, 149

[56] References Cited
UNITED STATES PATENTS

| | | | |
|---|---|---|---|
| 498,344 | 5/1893 | Williams | 52/403 |
| 889,240 | 6/1908 | Kanski | 52/403 |
| 1,530,774 | 3/1925 | Kepler | 161/144 |
| 1,560,700 | 11/1925 | Langer | 161/96 |
| 1,768,626 | 7/1930 | Pedersen | 52/347 |
| 2,021,370 | 11/1935 | Mallay | 248/350 |
| 2,076,034 | 4/1937 | Lampman | 248/358 |
| 2,165,500 | 7/1939 | Muirhead | 52/101 |
| 2,447,712 | 8/1948 | Nathan | 248/22 |
| 2,689,987 | 9/1954 | Berger | 52/573 |
| 2,700,406 | 1/1955 | Georges | 161/144 |
| 2,853,330 | 9/1958 | Harry | 52/403 |
| 2,859,486 | 11/1958 | Rovich | 52/293 |
| 2,893,722 | 7/1959 | Beck | 85/70 |

*Primary Examiner*—Frank L. Abbott
*Assistant Examiner*—James L. Ridgill, Jr.
*Attorney, Agent, or Firm*—Fulwider Patton Rieber Lee Utecht

[57] ABSTRACT

Vibration absorbing means installed between a structure and its support, the structure being of a size such as a house, and the support being means such as a foundation wall. In certain applications, a floor or similar member may be resiliently supported with respect to the remainder of the building to insulate the floor from vibration in the building, or conversely to decrease the vibration from equipment on the floor to the rest of the building. The structure is firmly connected to its support through vibration-absorbing means and no rigid vibration-transmitting connection is necessary between the two.

3 Claims, 6 Drawing Figures

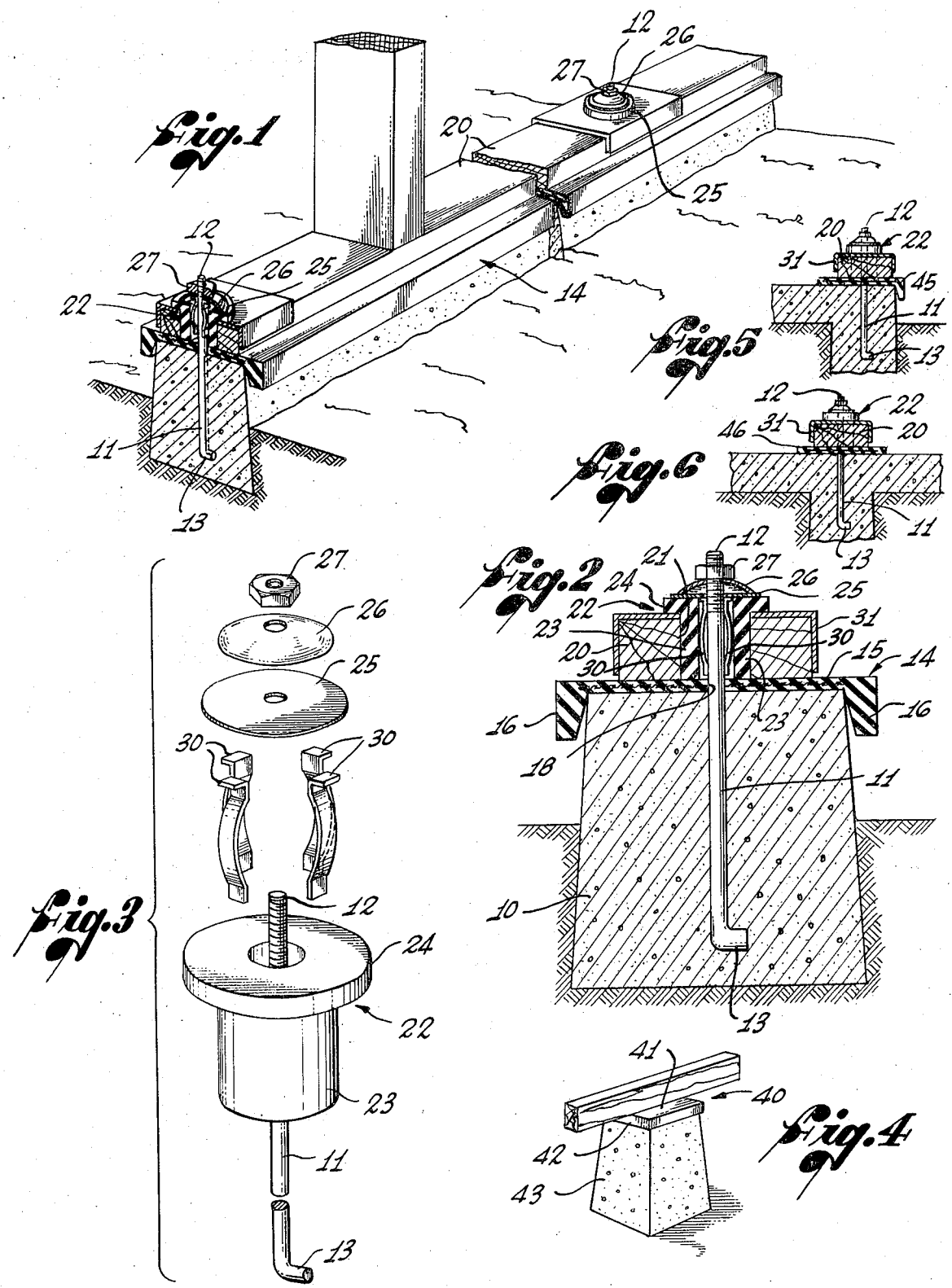

RESILIENT FOUNDATION CONNECTION

BACKGROUND OF THE INVENTION

It has long been recognized that the transmission of vibration to a structure from its support is generally undesirable, and likewise the transmission of vibration from a structure to its support gives rise to additional problems. Thus, a building located near a heavily traveled thoroughfare or near certain industrial equipment can be subjected to a great amount of vibration, and the people living and working within this structure are subjected to the same vibration. This can be very tiring to humans, and can also cause serious trouble in the case of equipment, such as computers, delicate instruments, etc., causing them to operate improperly. While there have previously been attempts to provide means for isolating such vibration, these attempts have heretofore not usually extended to structures the size and weight of a conventional house. Likewise, this has often required special isolating supports extending into the ground for the equipment.

While the present invention is useful in isolating vibration-producing equipment from the remainder of a building or structure, it is more especially directed to preventing vibration from external sources from being transmitted to the major portion of a structure, such as a house or similar building. Buildings that are so constructed, in addition to being more confortable for the occupants, experience less cracking of plaster and loosening of nails, and in general remain in good physical condition for a greater period of time.

SUMMARY OF THE INVENTION

The present invention contemplates a construction wherein a foundation wall has a generally channel-shaped cushion member extending along the top of the wall and with a sill of wood or other suitable material placed on top of the channel. The sill is held to the foundation wall by anchor bolts that are embedded in the foundation and project upwardly through the sill, with a resilient grommet or sleeve surrounding the bolt and holding the sill in place, while preventing the transmission of vibration between the two. A washer is held in place on the upper surface of the bolt by a screw that forces the washer down upon the upper surface of the grommet, while springs extending longitudinally in the central opening of the grommet are compressed by the washer and flex to insure that the anchor bolt is centered with respect to the grommet and the grommet is held against the sill. A channel-shaped metal reinforcing member fits over the upper surface of the sill adjacent the anchor bolt and grommet to reinforce the sill where its strength is reduced by reason of the hole in the sill.

DESCRIPTION OF DRAWING

FIG. 1 is a perspective view illustrating the foundation sill and portions of the framing of a structure, such as a house, with the vibration insulating construction illustrated;

FIG. 2 is a cross-sectional view of a foundation wall and sill with the vibration absorbing construction illustrated;

FIG. 3 is an exploded view of the anchor bolt, grommet, leaf springs, washer and nut; and FIG. 4 is a perspective view of a pier provided with an appropriate vibration insulating connection.

FIG. 5 is a fragmentary crosssectional view of a foundation and slab floor construction at the outer edge of the floor; and FIG. 6 is a similar view of a slab floor construction at a point where the slab extends in both directions from the sill.

DESCRIPTION OF PREFERRED FORM

Referring now to the drawings, and particularly to FIG. 1 thereof, the numeral 10 indicates generally a foundation wall of customary form in which are embedded anchor bolts 11 having a screw threaded upper end 12, and means such as an angled projection 13 held in place in the foundation to retain the bolt in the foundation and to prevent its turning. It will be appreciated that this form of foundation wall and anchor bolt construction is substantially conventional. The shape and height of the foundation wall 10 will be determined by the usual factors, such as strength of the soil, depth of frostline, etc., and the size of the anchor bolt 11 will correspondingly be determined by the nature of the structure to be erected.

Mounted upon the upper surface of the foundation wall 10 is a channel-shaped cushion member 14 whose web 15 is laid upon the upper surface of the foundation wall, and whose flanges 16 project downwardly along the sides of the foundation wall. A single ply of fabric 17 is preferably embedded in the web 15 to prevent the stretching of the cushion 14, and the flanges 16 preferably have their inner surfaces formed at an angle to the web 15 for ease in positioning the cushion 14 on the upper surface of the foundation wall 10. The cushion member 14 is formed of a natural or synthetic rubber material, preferably having a Durometer hardness in the range of 65 to 75, and impregnated or otherwise chemically treated with an insecticide to discourage or prevent insect infestation across the member. Generally the member 14 is made without any holes in it, and when it is installed upon a foundation wall, a hole 18 is drilled with an ordinary brace and bit to receive the anchor bolt 11. While the hole 18 could be provided at the time of manufacture, the spacing of the anchor bolts 11 may vary according to local building codes and other requirements, and also the precise location of the bolts may not be too well controlled. Consequently, it is generally better to form the individual holes 18 at the time of installing the cushion member 14.

Mounted on top of the cushion member 14 is the customary wood sill 20 that forms the lowermost wooden member of the wooden framing of the structure. Conventionally, the sill 20 is placed directly upon the upper surface of the foundation wall 10, but in the improved construction, the sill is placed upon the cushioning channel member, as indicated in FIGS. 1 and 2. The anchor bolts 11 extend up through the sill 20, and an enlarged hole 21 is provided to receive the anchor bolt and a grommet or flanged sleeve 22 that surrounds the bolt. The grommet 22 is formed of a resilient material, such as a natural or synthetic rubber, having a Durometer hardness of between 60 and 65, and by way of example only, the grommet may consist of a sleeve portion 23 having an external diameter of two inches, an internal diameter of one inch, and a length of slightly over two inches. A flange 24 at the upper end of the sleeve 23 has a thickness of one-half inch, an external diameter of three inches, and an internal diameter of one inch.

The grommet 22 is retained in place by means of a flat washer 25 that rests upon the upper surface of the flange 24 with a spring washer 26 between the flat washer and a nut 27 that engages the screw threads of the upper end of the anchor bolt 11.

Since the diameter of the anchor bolt 11 is generally in the neighborhood of one-half inch, and the diameter of the hole through the grommet 22 is in the neighborhood of one inch, it is desirable to have centering means insuring that the bolt and grommet remain concentric. This preferably is done with leaf spring members 30 that are inserted into the grommet around the bolt 11, and are bowed so that they bear against the interior of the grommet near the middle of the sleeve 23. The upper ends of the springs 30 are anchored to the washer 26 and these springs act as horizontal motion absorbers to absorb any horizontal motion of the anchor bolt 11 with respect to the sill 20. As indicated in FIGS. 2 and 3, the spring washer 26 is preferably domed so that it provides a certain amount of resilience, and it, in turn, acts as a vertical motion absorber between the anchor bolt 11 and the sill 20.

Since the sill 20 is conventionally formed of a piece of wood two inches high and four inches wide, and since the hole 21 formed in the sill to receive the grommet 22 is approximately two inches in diameter, the strength of the sill at the location of the hole is reduced. To strengthen the sill 20 at the holes 21, a metal reinforcing channel 31 is provided whose web extends across the upper surface of the sill 20 and whose flanges extend vertically downward along the vertical edges of the sill. A hole 32 is formed in the web of the channel 31 to align with hole 21 in the sill 20 so that the sleeve 23 of the grommet 22 may extend downwardly around the anchor bolt 11. Above the sill 20, the construction of the structure is conventional.

It will be appreciated, of course, that in structures of any size there must be supports intermediate the foundation wall, and it is customary to make use of piers that support the floor joists for this purpose. It is important that the pier be insulated from the floor in order to retain the benefits provided by the cushion channel 14, and consequently a rubber cushion 40 is provided, as indicated in FIG. 4. This cushion 40 is basically similar to the cushion channel 14, but preferably is square with a web 41 and flanges 42, similar to the flanges 16, along each edge of the square web to extend down along the sides of pier 43.

Where a concrete slab floor is to be poured within the area defined by the foundation wall 10, the pier construction shown in FIG. 4 is not needed. Additionally, since the floor is usually poured to the approximate level of the upper surface of the foundation wall 10, the inner flange 16 of the cushion channel 14 is unnecessary and may either be omitted in the manufacture of the channel, or out from the channel in the field. Such construction is indicated in FIG. 5, where the use of a single flange cushion 45 is shown. Similarly, when a wall is to be located where there is slab floor on either side of it, both flanges 16 may be omitted from the cushion channel 14, leaving a flat strip of resilient material 46, as shown in FIG. 6.

It will be recognized that, in addition to providing a resilient foundation connection, the construction herein described acts to form a moisture barrier between the ground and wall construction, and the exterior flange 16 acts as a stucco ground for terminating the lower edge of the exterior stucco. As previously indicated, the cushion channel 14 acts as a barrier to termites, and thus further improves the construction.

It will be appreciated that when a structure within a building is to be insulated from the building, the same general form of resilient connection may be used, but in general it will be unnecessary to use a concrete foundation wall, and instead a simple support, such as a wooden beam, may be laid on the floor of the building and a platform constructed above the floor in the same manner as heretofore described. Such a construction is often particularly useful where equipment such as a computer is to be intalled within a building and vibration reduction is required.

From the foregoing, it will be recognized that a construction has been described fully capable of achieving the objects and securing the advantages heretofore set forth.

While a preferred form of the construction has been disclosed, the invention is not to be limited to the particular form or arrangement of parts herein described and shown, except as limited by the following claims.

We claim:

1. A resilient supporting connection for a structure which includes:
    a rigid support;
    a resilient, vibration-insulating cushion on said support;
    a sill forming a part of said structure, bearing against said cushion and supported thereby;
    unitary connecting means rigidly attached at one end to said support, said connecting means extending through said resilient vibration insulating cushion and through said sill to hold said sill and support together; and
    resilient attaching means including resilient annular vibration-insulating means securing said other end of said connecting means to said sill, said annular means surrounding said connecting means, bearing against said sill and spacing said connecting means from said sill, whereby said sill is vibration-insulated from said support and from said connecting means, said annular means comprising a flanged cylindrical grommet means, said flange overlying and being urged by said connecting means against said sill, and spring means between said connecting means and said grommet.

2. A connection as defined in claim 1, wherein said spring means comprises leaf spring means within said cylindrical grommet and engaging said connecting means.

3. A connection as defined in claim 1, wherein said spring means comprises a spring washer between the upper surface of said flange and said connecting means.

* * * * *